United States Patent
Yun et al.

(10) Patent No.: US 11,042,246 B2
(45) Date of Patent: Jun. 22, 2021

(54) TOUCH PAD FOR DETECTING CONTACT AND CONTACTLESS TOUCHES, METHOD OF DETECTING TOUCH BY USING TOUCH PAD, AND DISPLAY DEVICE INCLUDING TOUCH PAD

(71) Applicant: G2TOUCH Co., LTD., Seongnam (KR)

(72) Inventors: Young Woo Yun, Seongnam (KR); Tae Wook Kim, Seongnam (KR); Hwa Joo Noh, Seongnam (KR); Ki Hwan Oh, Seongnam (KR)

(73) Assignee: G2TOUCH Co., LTD., Seongnam (KR)

( * ) Notice: Subject to any disclaimer, the term of this patent is extended or adjusted under 35 U.S.C. 154(b) by 118 days.

(21) Appl. No.: 16/382,107

(22) Filed: Apr. 11, 2019

(65) Prior Publication Data

US 2019/0369772 A1    Dec. 5, 2019

(30) Foreign Application Priority Data

Jun. 1, 2018  (KR) .......................... 10-2018-0063266

(51) Int. Cl.
*G06F 3/044*  (2006.01)

(52) U.S. Cl.
CPC ............ *G06F 3/044* (2013.01); *G06F 3/0446* (2019.05)

(58) Field of Classification Search
CPC .. G06F 3/0412; G06F 3/0446; G06F 3/04166; G06F 3/0445; G06F 3/04164; G06F 3/044; G06F 2203/04108
See application file for complete search history.

(56) References Cited

U.S. PATENT DOCUMENTS

| | | | | |
|---|---|---|---|---|
| 2014/0232691 | A1* | 8/2014 | Lee .......................... | G06F 3/044 345/174 |
| 2015/0205433 | A1* | 7/2015 | Mizuhashi .......... | G06F 3/04184 345/174 |

FOREIGN PATENT DOCUMENTS

| | | |
|---|---|---|
| KR | 101483346 B1 | 1/2015 |
| KR | 101602842 B1 | 3/2016 |
| KR | 101784969 B1 | 10/2017 |
| KR | 101848274 B1 | 4/2018 |

* cited by examiner

*Primary Examiner* — Shaheda A Abdin

(57) ABSTRACT

The present invention relates to a display device having a touch detection function, and relates to a touch pad which is capable of detecting a contact touch and a contactless touch, a method of detecting a touch by using the same, and a display device including the same. According to the touch pad, the method of detecting a touch by using the touch pad, and the display device including the touch pad of the present invention, it is possible to simultaneously detect a contact touch and a contactless touch, and increase touch sensitivity by additionally applying a driving back voltage.

15 Claims, 10 Drawing Sheets

[FIG. 1A]
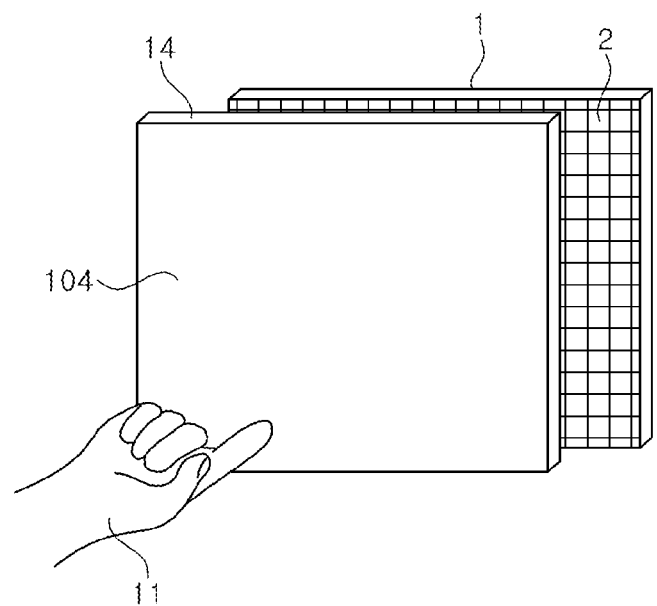
[FIG. 1B]
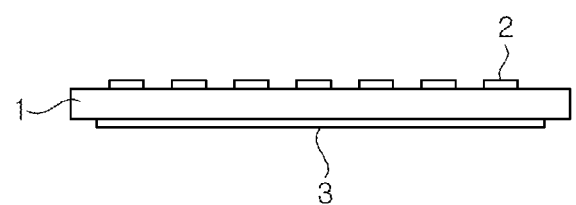

[FIG. 2A]
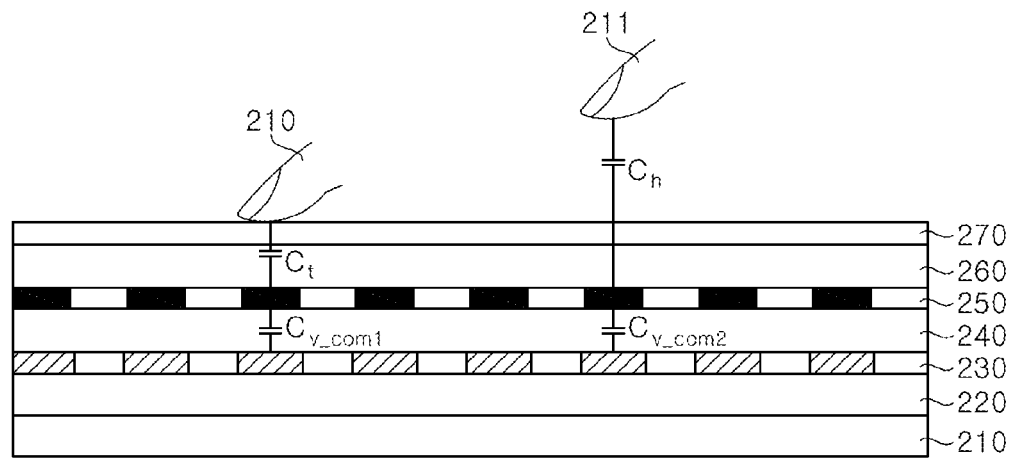
[FIG. 2B]
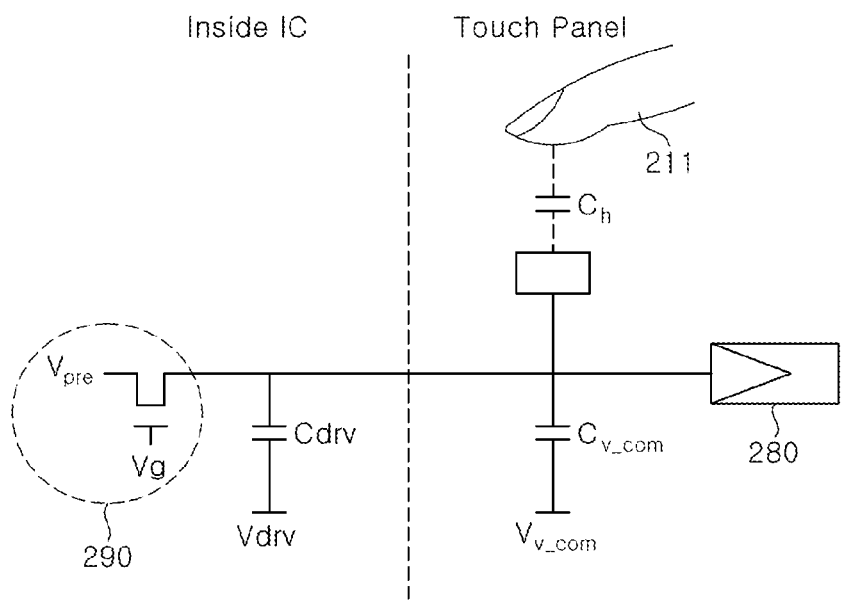

[FIG. 3]
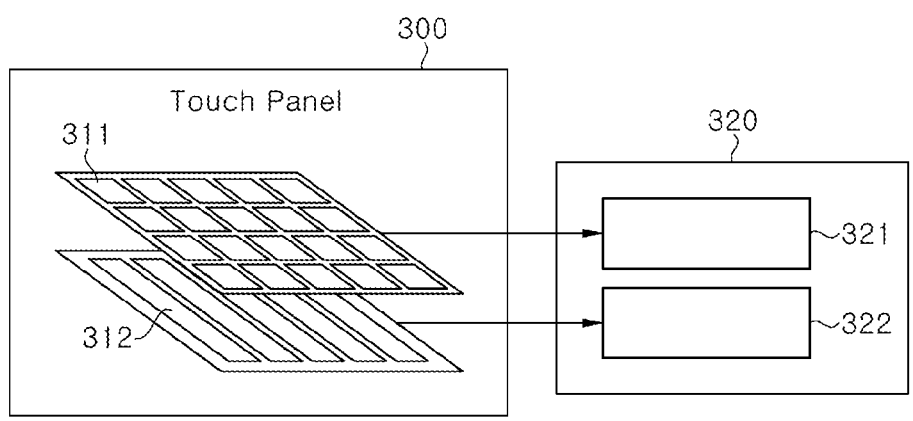

[FIG. 4A]
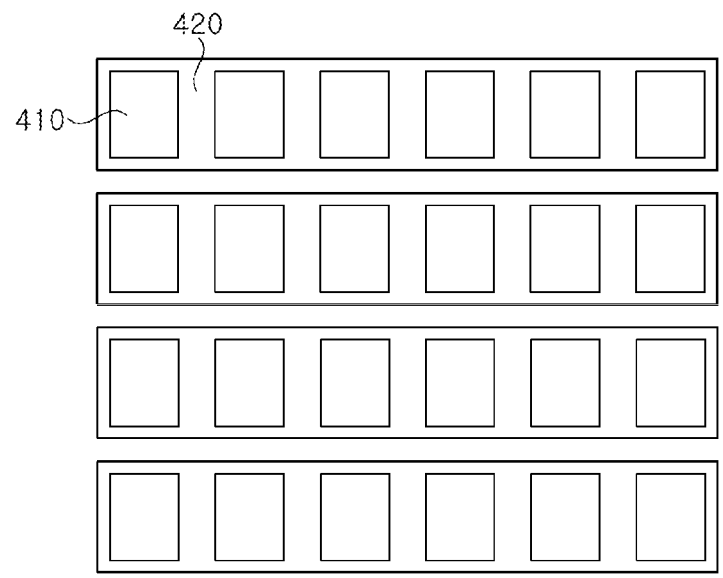
[FIG. 4B]
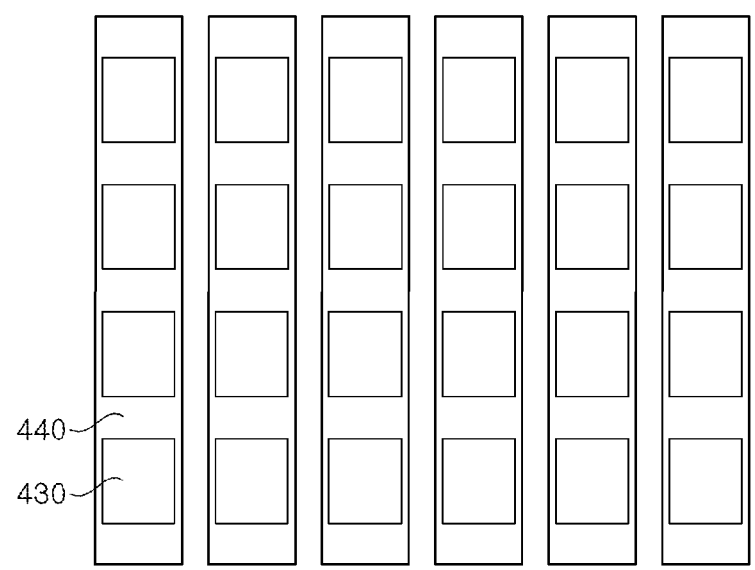

[FIG. 5A]
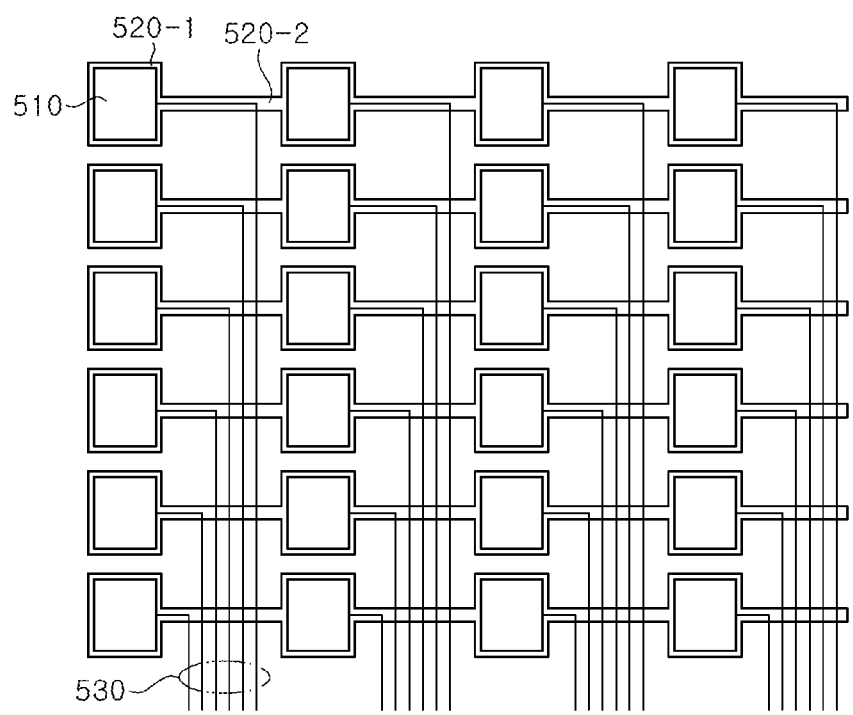

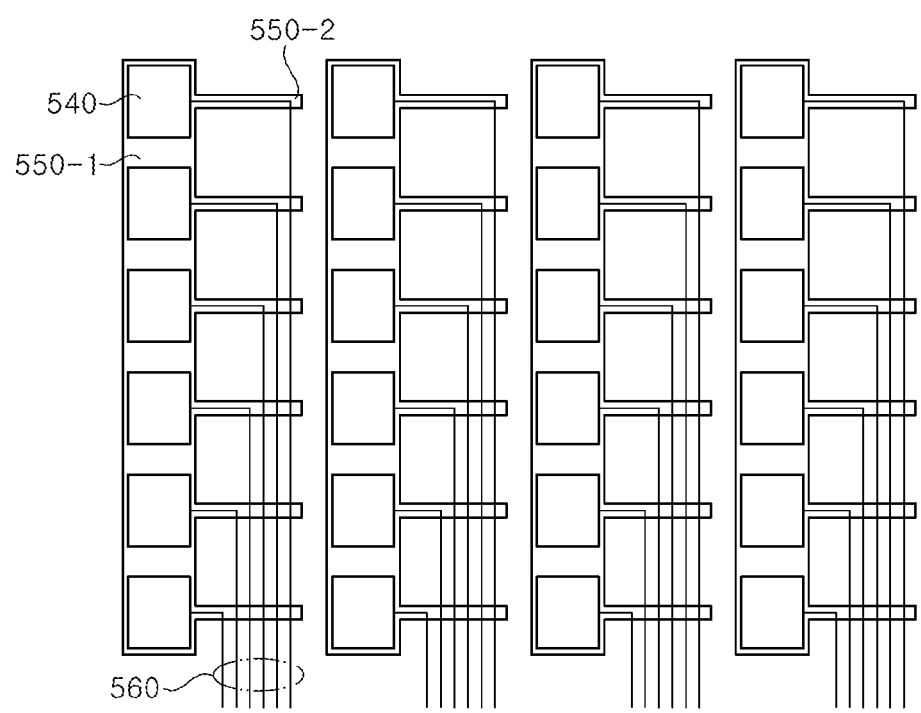
[FIG. 5B]

[FIG. 6A]
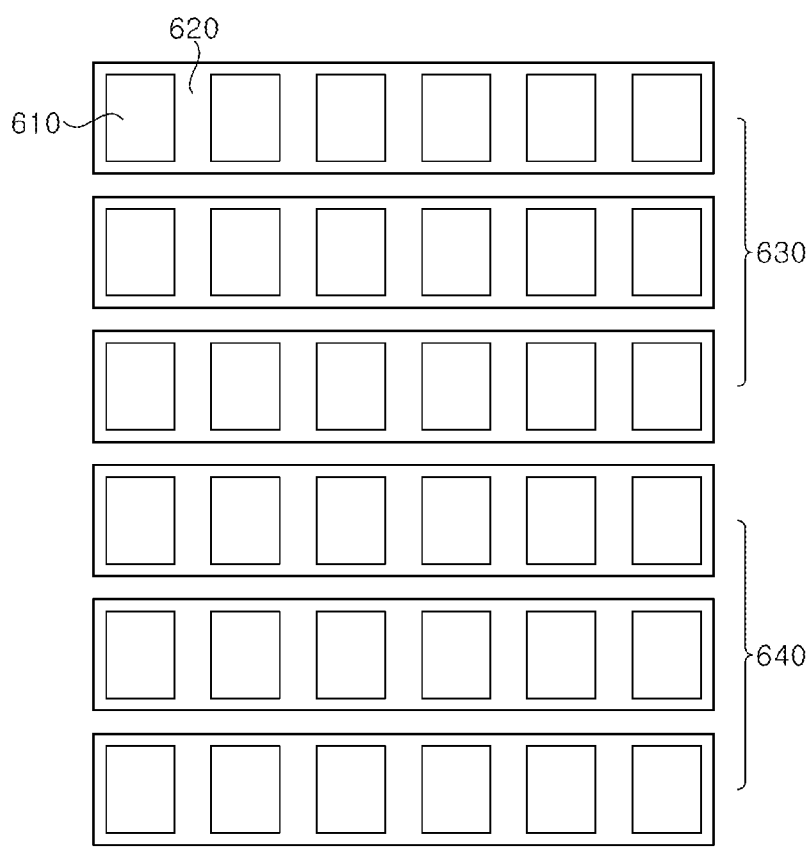

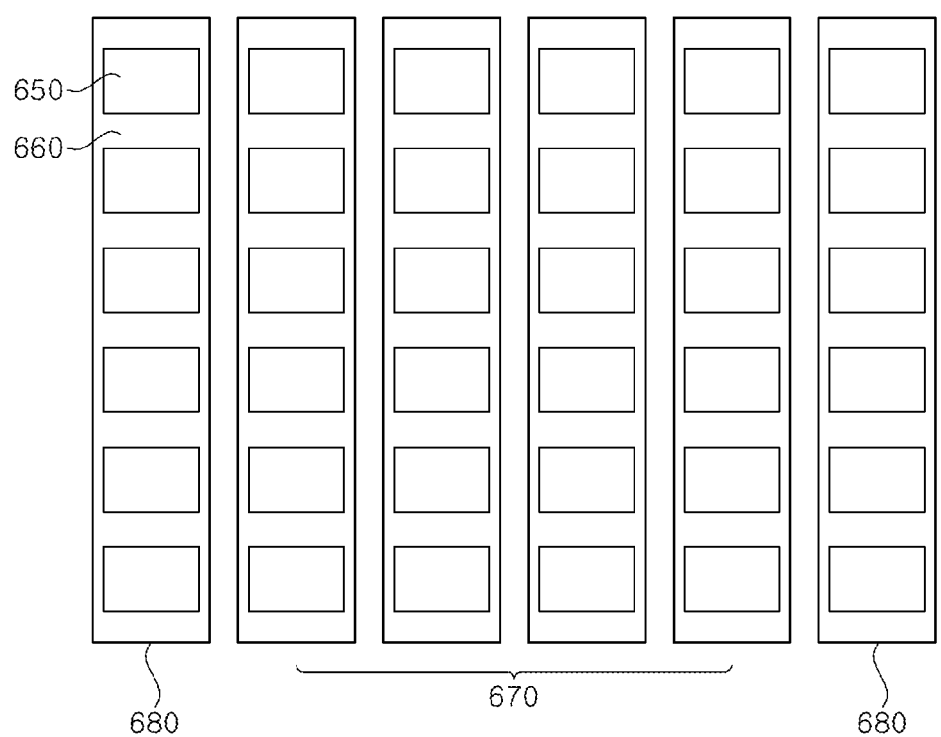

[FIG. 7]
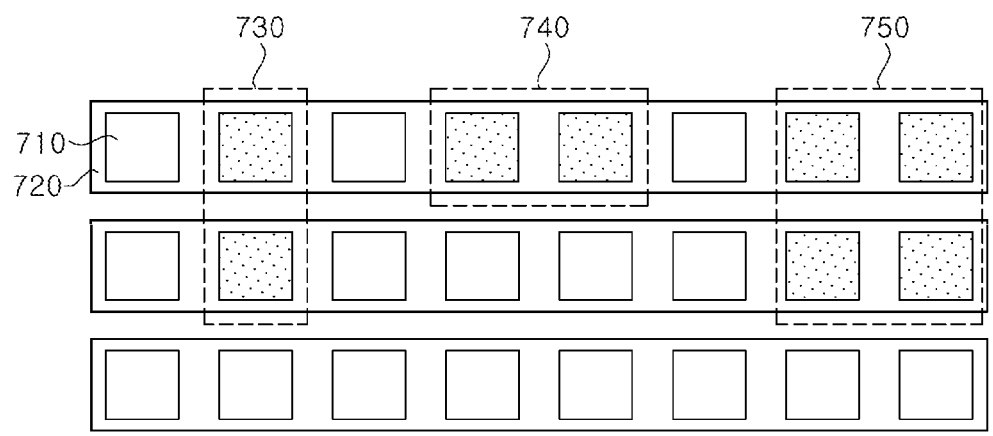

[FIG. 8]
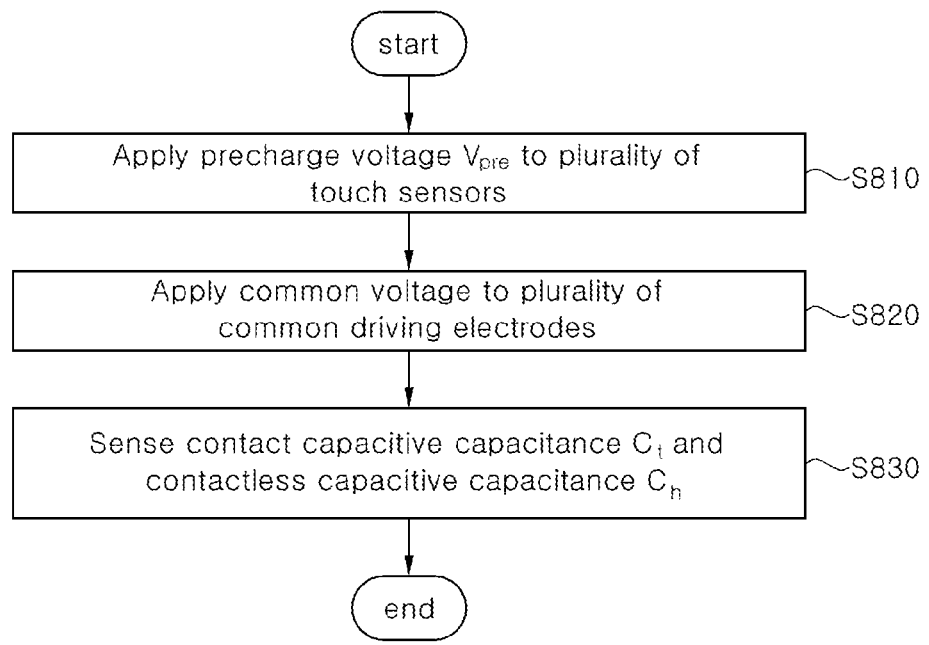

TOUCH PAD FOR DETECTING CONTACT AND CONTACTLESS TOUCHES, METHOD OF DETECTING TOUCH BY USING TOUCH PAD, AND DISPLAY DEVICE INCLUDING TOUCH PAD

CROSS-REFERENCE TO RELATED APPLICATIONS

This application claims priority to and the benefit of Korean Patent Application No. 10-2018-0063266 filed in the Korean Intellectual Property Office on Jun. 1, 2018, the entire contents of which are incorporated herein by reference.

TECHNICAL FIELD

The present invention relates to a display device having a touch detection function, and more particularly, to a touch pad which is capable of detecting a contact touch and contactless touch, a method of detecting a touch by using the same, and a display device including the same.

BACKGROUND ART

Recently, a hover touch technology, in which a device is operated or a touch is detected without touching a screen of a smart device, has been developed. Hover means a state where a touch input means, such as a finger and a stylus is present in front of a display device, but is not in direct contact with the display device.

A touch pad using a hover touch in the related art is illustrated in FIG. 1.

FIG. 1A is a front view of a touch pad in the related art, and FIG. 1B is a lateral view of the touch pad in the related art.

The touch pad is formed of a capacitive sensor, which includes measuring electrodes 2 formed at one side of a both-sided flexible printed circuit 1, and a guard 3 of an electroconductive material formed at a side opposite to a lateral surface, on which the measuring electrode is formed.

Signals generated in the measuring electrodes 2 are read by applying the same alternating-current potential as a potential applied to the measuring electrodes 2 to the guard 3, and a movement of a touch input means 11 is detected.

The guard 3, to which the same alternating-current potential as the potential applied to the measuring electrodes 2 is applied, is an integrally formed electroconductive material, that is, an electrode, and is much larger than the measuring electrodes, so that when resistance of a pattern is high, a load is generated in the measuring electrodes 2, thereby generating stabilization time delay and sensitivity deterioration of the measuring electrode.

It is impossible to distinguish one or more multi-touch signals and a signal having a space and a slope.

The guard 3, to which the same alternating-current potential as the potential applied to the measuring electrodes 2 is applied, and which is the integrally formed electroconductive material, that is the electrode, cannot distinguish a direct finger detection area and a hover detection area at the same time and process the sensing, so that a detection time of the overlapping areas is added.

When the integrally formed electrode 3 incurs a phenomenon, such as a cross talk, which influences a driving potential of a display device, it is impossible to adjust a potential of a specific area so as to alleviate the phenomenon or remove the influence according to a structure of a touch detecting device.

RELATED ART LITERATURE

Patent Document (Patent Document 1) Korean Patent No. 10-1784969

SUMMARY OF THE INVENTION

The present invention is conceived to solve the foregoing problems of the touch pad in the related art, and provides a touch pad, which is capable of detecting a contact touch and a contactless touch, a method of detecting a touch by using the same, and a display device including the same.

An exemplary embodiment of the present invention provides a touch pad disposed on a display device, the touch pad including: a touch sensor layer including a plurality of touch sensors, which generates contact capacitive capacitance $C_t$ and contactless capacitive capacitance $C_h$ between a touch input means; a common driving electrode layer including a plurality of common driving electrodes, which generates common electrode capacitance $C_{v\_com}$ between the touch sensor; a touch sensor layer control unit configured to sense the contact capacitive capacitance $C_t$ and the contactless capacitive capacitance $C_h$; and a common driving electrode layer control unit configured to generate first common electrode capacitance $C_{v\_com1}$ by applying a first common voltage to a first common driving electrode corresponding to the touch sensor generating the contact capacitive capacitance $C_t$ and generate second common electrode capacitance $C_{v\_com2}$ by applying a second common voltage to a second common driving electrode corresponding to the touch sensor generating the contactless capacitive capacitance $C_h$.

The touch sensors may be arranged in an array formed in a matrix within an active area of the display device.

Each common driving electrode may have a size so as to correspond to one or more touch sensors within at least one column of the array or correspond to one or more touch sensors within at least one row of the array.

The touch sensor pad may further include a plurality of sensor signal lines configured to be connected to the touch sensor and transmit a touch signal generated in the touch sensor, in which in the common driving electrode, a width of an area corresponding to the touch sensor may be larger than a width of an area corresponding to the sensor signal line.

The touch pad may further include a touch drive IC, in which the touch drive IC includes: a driving voltage generating unit, which is synchronized with the first common voltage and the second common voltage and generates a driving voltage; and a touch detecting unit, which determines a contact touch or a contactless touch by the touch input means of the touch sensor.

The touch detecting unit may determine the contact touch or the contactless touch by the touch input means of the touch sensor based on a difference between a voltage at the time, at which the contact capacitive capacitance $C_t$ or the contactless capacitive capacitance $C_h$ is generated, and a voltage at the time, at which the contact capacitive capacitance $C_t$ or the contactless capacitive capacitance $C_h$ is not generated, in the state where the driving voltage is applied to the driving capacitor $C_{drv}$ within the touch drive IC.

The touch pad may further include a memory in a unit of a frame, which sequentially stores the contactless capacitive capacitance $C_h$ generated in the touch sensor, in which the touch detecting unit may interpret a 3D input of the touch input means by using the contactless capacitive capacitance $C_h$ stored in the memory.

As the first common voltage, an reverse phase voltage of a voltage applied to the touch sensor may be applied, and as the second common voltage, an in-phase voltage of a voltage applied to the touch sensor may be applied.

The touch detecting unit may sense a touch by grouping the two or more touch sensors.

Another exemplary embodiment of the present invention provides a method of detecting a touch by using a touch pad disposed on a display device, the method including: applying a precharge voltage $V_{pre}$ to a plurality of touch sensors so as to generate contact capacitive capacitance $C_t$ and contactless capacitive capacitance $C_h$ when a contact touch or a contactless touch is generated by a touch input means; applying a common voltage to a plurality of common driving electrodes so as to generate common electrode capacitance $C_{v\_com}$ between the touch sensor, in which first common electrode capacitance $C_{v\_com1}$ is generated by applying a first common voltage to a first common driving electrode corresponding to the touch sensor generating the contact capacitive capacitance $C_t$, and second common electrode capacitance $C_{crv\_com2}$ is generated by applying a second common voltage to a second common driving electrode corresponding to the touch sensor generating the contactless capacitive capacitance $C_h$; and sensing the contact capacitive capacitance $C_t$ and the contactless capacitive capacitance $C_h$.

The touch sensors may be arranged in an array formed in a matrix within an active area of a display device.

Each common driving electrode may have a size so as to correspond to one or more touch sensors within at least one column of the array or correspond to one or more touch sensors within at least one row of the array.

In the common driving electrode, a width of an area corresponding to the touch sensor may be larger than a width of an area corresponding to at least one sensor signal line transmitting a touch signal generated in the touch sensor.

The method may further include: generating a driving voltage while being synchronized with the first common voltage and the second common voltage by a driving voltage generating unit within a touch drive IC; and determining, by the touch detecting unit within the touch drive IC, a contact touch or a contactless touch by the touch input means of the touch sensor based on a difference between a voltage at the time, at which the contact capacitive capacitance $C_t$ or the contactless capacitive capacitance $C_h$ is generated, and a voltage at the time, at which the contact capacitive capacitance $C_t$ or the contactless capacitive capacitance $C_h$ is not generated, in the state where the driving voltage is applied to a driving capacitor $C_{drv}$ within the touch drive IC.

The method may further include: sequentially storing the contactless capacitive capacitance $C_h$ generated in the touch sensor in a memory in a unit of a frame; and interpreting, by the touch detecting unit, a 3D input of the touch input means by using the contactless capacitive capacitance $C_h$ stored in the memory.

As the first common voltage, an reverse phase voltage of a voltage applied to the touch sensor may be applied, and as the second common voltage, an in-phase voltage of a voltage applied to the touch sensor may be applied.

The plurality of touch sensors may be grouped by the touch detecting unit and simultaneously sense the touch.

Still another exemplary embodiment of the present invention provides a display device including any one of the touch pads.

According to the touch pad, the method of detecting a touch by using the touch pad, and the display device including the touch pad of the present invention, it is possible to simultaneously detect a contact touch and a contactless touch.

According to the touch pad, the method of detecting a touch by using the touch pad, and the display device including the touch pad of the present invention, it is possible to increase touch sensitivity by additionally applying a driving back voltage.

A structure of the plurality of separated common driving electrodes is provided, so that an influence of a potential having a frequency generable between the first common driving electrode and a display may be blocked or avoided by a structural characteristic of the second common driving electrode.

The second common driving electrode may distinguish a multi-touch signal and a multi-hover signal.

When a phenomenon, such as a crosstalk, is generated between the first common electrode, the second common electrode, and a display driving device, it is possible to alleviate or remove the phenomenon, such as a crosstalk, by grouping the separated first common electrode and the second common driving electrode.

BRIEF DESCRIPTION OF THE DRAWINGS

FIG. 1A is a front view of a touch pad in the related art, and FIG. 1B is a lateral view of the touch pad in the related art.

FIG. 2A is a lateral view schematically illustrating a touch pad of the present invention.

FIG. 2B schematically illustrates a circuit diagram for detecting a touch of the present invention.

FIG. 3 schematically illustrates a touch pad and a touch drive IC of the present invention.

FIGS. 4A and 4B are diagrams illustrating a disposition configuration of a touch sensor and a common driving electrode of the present invention.

FIGS. 5A and 5B are diagrams illustrating a disposition configuration of a touch sensor, a common driving electrode, and a sensor signal line of the present invention.

FIGS. 6A and 6B are conceptual diagrams of a touch pad, which is capable of simultaneously detecting contact and contactless touches of the present invention.

FIG. 7 is a diagram conceptually illustrating one exemplary embodiment for increasing touch sensitivity of a touch pad of the present invention.

FIG. 8 is a flowchart schematically illustrating a method of detecting a touch by using a touch pad of the present invention.

DETAILED DESCRIPTION

For the full understanding of the present invention, the advantages of an operation of the present invention, and the purpose achieved by the implementation of the present invention, the accompanying drawings exemplifying an exemplary embodiment of the present invention and the contents described with reference to the accompanying drawings will be referred.

Hereinafter, the present invention will be described in detail by describing the exemplary embodiment of the present invention with reference to the accompanying drawings. The same reference numeral presented in each drawing denotes the same member.

Hereinafter, an exemplary embodiment of the present invention will be described in detail with reference to the accompanying drawings and Example.

A particular procedure of determining contact and contactless touches in the present invention is widely known by technicians of the technical field, so that a particular disclosure thereof will be omitted. Particularly, a method of detecting a touch by using a contactless touch, that is, hovering, may also be used together with a method of detecting an object through optical imaging or an interface structure including a voice recognition means.

In the present invention, the touch sensor and the common driving electrode may be formed of a transparent conductor or metal on a flexible substrate.

When the touch sensor and the common driving electrode within a touch pad are formed of a transparent conductor, and the touch pad is installed on a display device, the transparent conductor is formed of a conductive transparent material, such as an indium Tin Oxide (ITO), an Antimony Tin Oxide (ATO), a Carbon Nano Tube (CNT), and an Indium Zinc Oxide (IZO), or a transparent material having the similar conductive characteristic to that of the conductive transparent material.

The touch sensor within the touch pad may be patterned in various forms. For example, the touch sensor may have a dot matrix form, in which the touch sensors are arranged in a matrix form in a display active area, or linear patterns may be arranged in a longitudinal direction and/or a transverse direction.

In the present invention, the sensor signal line is a line transmitting a touch signal, which is formed when a finger or a touch means (for example, a touch pen) having the similar conductive characteristic to that of the finger approaches the touch pad, to a touch detecting unit, and may be formed of a conductive transparent material, similar to the touch sensor, and may also be formed of an opaque material, such as metal, depending on a case.

In the present invention, a driving capacitor $C_{drv}$ is a configuration for applying a driving voltage for detecting a touch, and has one end connected to the touch sensor and the other end, to which a driving voltage is applied, to increase touch sensitivity when a touch is detected by the touch detecting unit.

FIG. 2A is a lateral view schematically illustrating a touch pad of the present invention.

In the present invention, a touch pad disposed on a display device 210 includes a touch sensor layer 250, a common driving electrode layer 230, a touch sensor layer control unit 321 (see FIG. 3), and a common driving electrode layer control unit 322 (see FIG. 3).

Reference numerals 220, 240, and 260 of FIG. 2 are Optically Clear Adhesive (OCA) films or Optically Clear Resin (OCR) which insulate adjacent members from each other.

The touch sensor layer 250 may be disposed in a matrix shape by patterning a conductive material on a flexible substrate as described above (see reference numeral 310 of FIG. 3).

The touch sensor layer 250 includes a plurality of touch sensors, which generates contact capacitive capacitance $C_t$ and contactless capacitive capacitance $C_h$ in a space from the touch input means.

The touch sensor layer control unit 321 (see FIG. 3) senses contact capacitive capacitance $C_t$ and contactless capacitive capacitance $C_h$ by a time division method or an area division method.

The contact capacitive capacitance $C_t$ is generated by touching a cover glass 270 positioned at the topmost portion of the touch pad as illustrated at the left side of FIG. 2A.

The contactless capacitive capacitance $C_h$ is generated by a movement of a hand with a predetermined distance (for example, within several cm) separated without a direct contact to the touch pad as illustrated at the right side of FIG. 2A.

Each touch sensor within the touch pad is in a state of being applied with a precharge voltage $V_{pre}$ through a switching element (for example, a three-terminal switching device).

The common driving electrode layer 230 includes a plurality of common driving electrodes, which generates common electrode capacitance $C_{v\_com}$ between the touch sensor. A width of the common driving electrode is larger than a width in the touch sensor, so that the common driving electrode may surround the touch sensor (see FIGS. 4 to 7).

The common driving electrode layer control unit 322 (see FIG. 3) generates first common electrode capacitance $C_{v\_com1}$ by applying a first common voltage (for example, an reverse phase voltage of a voltage applied to the corresponding touch sensor or GND) to a first common driving electrode corresponding to the touch sensor which generates the contact capacitive capacitance $C_t$, and second common electrode capacitance $C_{v\_com2}$ by applying a second common voltage (for example, the in-phase voltage of a voltage applied to the corresponding touch sensor) to a second common driving electrode corresponding to the touch sensor which generates the contactless capacitive capacitance $C_h$.

Unlike the integrally formed guard 3 in the touch pad in the related art disclosed in FIG. 1, the plurality of common driving electrodes is formed, so that it is possible to form the contact capacitive capacitance $C_t$ and the contactless capacitive capacitance $C_h$ independently or simultaneously.

FIG. 2B schematically illustrates a circuit diagram for detecting a touch of the present invention.

FIG. 2B schematically illustrates the touch pad and a touch drive IC 280, and the internal portion of the IC at the left side conceptually illustrates a circuit within a touch drive IC.

A precharging switching element 290 applies a precharge voltage to the touch sensor.

The touch pad of the present invention includes a dry voltage generating unit (not illustrated within the touch drive IC in order to increase touch sensitivity.

When a touch is detected, the driving voltage generating unit applies a driving voltage to a driving capacitor $C_{drv}$.

A touch panel section illustrated at the right side of FIG. 2B illustrates an example of a case where the contactless capacitive capacitance $C_h$ is generated, and when a finger 211 touches the touch pad, the contact capacitive capacitance $C_t$ may be generated.

According to a voltage value applied to the common driving electrode, a value of the capacitive capacitance formed between the touch sensor may be changed. That is, the common electrode capacitance $C_{v\_com2}$ generated by applying the common voltage (for example, the in-phase voltage as the voltage applied to the corresponding touch sensor) to the common driving electrode corresponding to the touch sensor generating the contactless capacitive capacitance $C_h$ may be different from the common electrode capacitance $C_{v\_com1}$ generated by applying the common voltage (for example, the reverse phase voltage of the voltage applied to the corresponding touch sensor) to the common driving electrode corresponding to the touch sensor which generates the contact capacitive capacitance $C_t$.

In general, the common voltage applied to the common driving electrode corresponding to the touch sensor generating the contact capacitive capacitance $C_t$ may be smaller than the common voltage applied to the common driving electrode corresponding to the touch sensor generating the contactless capacitive capacitance $C_h$.

The touch detecting unit (not illustrated) within the touch drive IC of the present invention determines a contact touch or a contactless touch by the touch input means of the touch sensor based on a difference between the voltage at the time, at which the contact capacitive capacitance $C_t$ or the contactless capacitive capacitance $C_h$ is generated, and the voltage at the time, at which the contact capacitive capacitance $C_t$ or the contactless capacitive capacitance $C_h$ is not generated, in the state where the driving voltage $V_{drv}$ is applied to the driving capacitor $C_{drv}$.

A voltage sensed by the touch sensor when there is no contact or contactless touch may be calculated by Equation 1 below.

$$V_{non\text{-}touch} = V_{pre} - V_{drv}\frac{C_{drv}}{C_{drv}+C_{vcom}} - V_{com}\frac{C_{vcom}}{C_{drv}+C_{vcom}} \quad \text{[Equation 1]}$$

A voltage sensed by the touch sensor when there is any one of a contact touch and a contactless touch may be calculated by Equation 2 below. For illustration, an equation for calculating a voltage using the contactless capacitive capacitance $C_h$ is exemplified.

$$V_{touch} = \quad \text{[Equation 2]}$$
$$V_{pre} - V_{drv}\frac{C_{drv}}{C_{drv}+C_{vcom}+C_h} - V_{com}\frac{C_{vcom}}{C_{drv}+C_{vcom}+C_h}$$

In Equations 1 and 2, $V_{non\text{-}touch}$ is a voltage sensed by the touch sensor when there is no touch, $V_{touch}$ is a voltage sensed by the touch sensor when there is a touch, $V_{pre}$ is a precharge voltage applied to the touch sensor, $V_{drv}$ is a driving voltage, $V_{com}$ is a common voltage applied to the common driving electrode, $C_{drv}$ is driving capacitance, $C_{vcom}$ is common electrode capacitance, and $C_h$ is contactless capacitive capacitance.

In Equations 1 and 2, stray capacitance $C_p$ substantially present within the capacitor may be additionally included, but will be omitted herein for clearance.

A change in a voltage for determining whether a touch to the touch sensor is generated may be calculated by a difference between Equations 1 and 2.

$$V_{touch\text{-}signal} = V_{non\text{-}touch} - V_{touch} \quad \text{[Equation 3]}$$

FIG. 3 schematically illustrates the touch pad and the touch drive IC of the present invention.

As illustrated in FIG. 1, the plurality of touch sensors 311 formed in the touch sensor layer may be arranged in an array (M×N) having a matrix form within an active area of the display device.

The common driving electrode 312 formed in the common driving electrode layer is formed to have a size including the plurality of touch sensors (for example, four) arranged in each row of the touch sensor.

Strictly, an OCA film or an OCR is included between the touch sensor layer and the common driving electrode layer as illustrated in FIG. 2A, but is omitted in FIG. 3 for clearance in the description.

The touch sensor layer control unit 321 and the common driving electrode layer control unit 322 may be included in the touch drive IC 320, but each of the touch sensors and each of the common driving electrodes may be connected to the corresponding control unit through a separate signal line.

The touch drive IC 322 may further include a driving voltage generating unit (not illustrated).

The driving voltage generating unit is synchronized with the common voltage applied to the common driving electrode and generates a driving voltage.

The touch drive IC 322 may further include a touch detecting unit (not illustrated).

The touch detecting unit determines whether a contact touch or a contactless touch is generated in the touch sensor by the touch input means by using foregoing Equations 1, 2, and 3.

That is, the touch detecting unit determines whether a contact touch or a contactless touch is generated in the touch sensor by the touch input means based on a difference between the voltage at the time, at which the contact capacitive capacitance $C_t$ or the contactless capacitive capacitance $C_h$ is generated, and the voltage at the time, at which the contact capacitive capacitance $C_t$ or the contactless capacitive capacitance $C_h$ is not generated in the state where the driving voltage is applied to the driving capacitor $C_{drv}$.

The touch drive IC may further include a frame memory (not illustrated).

The frame memory may sequentially store the contactless capacitive capacitance $C_h$ generated in the touch sensor. The touch detecting unit may interpret a 3D input of the touch input means by using the contactless capacitive capacitance $C_h$ stored in the frame memory.

FIGS. 4A and 4B are diagrams illustrating a disposition configuration of the touch sensor and the common driving electrode of the present invention.

FIGS. 4 to 6 illustrate several exemplary embodiments of the disposition configuration of the touch sensor and the common driving electrode of the present invention and the disposition configuration of the touch sensor, the common driving electrode, and the sensor signal line, but the touch sensor is formed on the touch sensor layer that is the flexible substrate, the common driving electrode is formed on the common driving electrode layer that is another flexible substrate, and the OCA film or the OCR layer is interposed between the touch sensor layer and the common driving electrode layer, but the illustration of each flexible substrate and the OCA film or the OCR resin layer is omitted for clearance of the description.

In FIG. 4A, a common driving electrode 420 has a size so as to include each row of an array of a touch sensor 410, and in FIG. 4B, a common driving electrode 440 has a size so as to include each column of an array of a touch sensor 430.

Although not particularly illustrated, the common driving electrode may have a size so as to include only partial electrodes of each row of the touch sensor array.

Accordingly, each common driving electrode may have a size so as to include one or more touch sensors within at least one column of the array.

Each common driving electrode may have a size so as to correspond to one or more touch sensors within at least one row of the array.

FIGS. 5A and 5B are diagrams illustrating a disposition configuration of a touch sensor, a common driving electrode, and a sensor signal line of the present invention.

In FIG. 5A, a common driving electrode 520 is formed so that a width 520-1 of an area corresponding to a touch sensor is larger than a width 520-2 of an area corresponding to a sensor signal line 530.

In FIG. 5B, a width 550-2 of an area corresponding to a sensor signal line 560 is smaller.

FIGS. 6A and 6B are conceptual diagrams of a touch pad, which is capable of simultaneously detecting contact and contactless touches of the present invention.

FIG. 6A illustrates an example in which a section for a contact touch and a section for a contactless touch are divided according to a row of a touch sensor array.

The section for a contact touch and the section for a contactless touch are not fixed, and may be circulated in a concept of time division by the touch sensor layer control unit and the common driving electrode layer control unit.

In FIG. 6A, three touch sensor rows in an upper layer section denoted by reference numeral 630 is a section for detecting a contactless touch. In FIG. 6A, three touch sensor rows in a lower layer section denoted by reference numeral 640 is a section for detecting a contact touch.

As described above, a common voltage applied to the common driving electrode (the section 640) corresponding to the touch sensor generating the contact capacitive capacitance $C_t$ is different from a common voltage applied to the common driving electrode (the section 630) corresponding to the touch sensor generating the contactless capacitive capacitance $C_h$.

As the exemplary embodiment, the common voltage applied to the common driving electrode (the section 640) corresponding to the touch sensor generating the contact capacitive capacitance $C_t$ is an reverse phase voltage of a voltage applied to the touch sensor, and the common voltage applied to the common driving electrode (the section 630) corresponding to the touch sensor generating the contactless capacitive capacitance $C_h$ is an in-phase voltage of the voltage applied to the touch sensor.

In FIG. 6B, four touch sensor columns in a middle section denoted by reference numeral 670 is a section for detecting a contactless touch. In FIG. 6B, both end touch sensor columns denoted by reference numeral 680 is a section for detecting a contact touch.

FIG. 7 is a diagram conceptually illustrating one exemplary embodiment for increasing touch sensitivity of a touch pad of the present invention.

The touch detecting unit within the touch drive IC of the present invention may sense a touch by grouping two or more touch sensors.

Reference numeral 730 of FIG. 7 illustrates a case of 1 X Y(2) grouping, in which two touch sensors within one column formed on different common driving electrodes are grouped, as an example.

Reference numeral 740 of FIG. 7 illustrates a case of X(2) X 1 grouping, in which two touch sensors within one row formed on one common driving electrode are grouped, as an example.

Reference numeral 750 of FIG. 7 illustrates a case of X(2) X Y(2) grouping as an example.

The exemplary embodiment of the grouping of the touch sensors illustrated in FIG. 7 may be more advantageous when a contactless touch is determined.

The reason is that when a direct contact is generated in a surface of a touch screen, the touch panel has a change (about 0.2 to 1 pF) of capacitance, but the amount of change in capacitance according to a contactless operation is several tens of fF to several fF, which is considerably small, according to a distance between the touch input means and the touch sensor layer.

FIG. 8 is a flowchart schematically illustrating a method of detecting a touch by using the touch pad of the present invention.

In the method of detecting a touch, a precharge voltage $V_{pre}$ is applied to the plurality of touch sensors in operation S810. The application of the precharge voltage is performed by using the switching element 290 of FIG. 2.

By the application of the precharge voltage, contact capacitive capacitance $C_t$ or contactless capacitive capacitance $C_h$ is generated when a contact or non-contact of a touch input means is generated.

In operation S820, a common voltage is applied to the plurality of common driving electrodes.

By the application of the common voltage to the plurality of common driving electrodes, common electrode capacitance $C_{v\_com}$ is generated between the touch sensor.

First common electrode capacitance $C_{v\_com}$ is generated by applying a first common voltage to a first common driving electrode corresponding to the touch sensor generating the contact capacitive capacitance $C_t$.

Second common electrode capacitance $C_{dvr\_com2}$ is generated by applying a second common voltage to a second common driving electrode corresponding to the touch sensor generating the contactless capacitive capacitance $C_h$.

In operation S830, the touch drive IC, particularly, the touch sensor layer control unit 321, senses the contact capacitive capacitance $C_t$ and the contactless capacitive capacitance $C_h$ by a tune division method or an area division method.

The present invention is not limited to the exemplary embodiments and the accompanying drawings, and those skilled in the art will appreciate that various changes, modifications, or substitutions may be possible within the scope of the technical spirit of the present invention.

What is claimed is:

1. A touch pad disposed on a display device, the touch pad comprising:
    a touch sensor layer including a plurality of touch sensors, which generates contact capacitive capacitance $C_t$ and contactless capacitive capacitance $C_h$ between the touch sensor layer and a touch input means;
    a common driving electrode layer including a plurality of common driving electrodes, which generates common electrode capacitance $C_{v\_com}$ between the common driving electrode layer and the touch sensor layer;
    a touch sensor layer control unit configured to sense the contact capacitive capacitance $C_t$ and the contactless capacitive capacitance $C_h$; and
    a common driving electrode layer control unit configured to generate first common electrode capacitance $C_{v\_com1}$ by applying a first common voltage to a first common driving electrode corresponding to the touch sensor generating the contact capacitive capacitance $C_t$ and generate second common electrode capacitance $C_{v\_com2}$ by applying a second common voltage to a second common driving electrode corresponding to the touch sensor generating the contactless capacitive capacitance $C_h$,
    wherein the touch pad further comprises a touch drive IC including a touch detecting unit that determines a contact touch or a contactless touch by the touch input means based on a difference between a first voltage, at which the contact capacitive capacitance $C_t$ or the contactless capacitive capacitance $C_h$ is generated, and a second voltage, at which the contact capacitive capacitance $C_t$ or the contactless capacitive capacitance $C_h$ is not generated, in a state where a driving voltage is applied to a driving capacitor $C_{drv}$ within the touch drive IC.

2. The touch pad of claim 1, wherein the touch sensors are arranged in an array formed in a matrix within an active area of the display device.

3. The touch pad of claim 2, wherein each common driving electrode has a size so as to correspond to one or more touch sensors within at least one column of the array or correspond to one or more touch sensors within at least one row of the array.

4. The touch pad of claim 3, further comprising:
a plurality of sensor signal lines configured to be connected to the touch sensors and transmit a touch signal generated in the touch sensor,
wherein in the common driving electrode, a width of an area corresponding to the touch sensor is larger than a width of an area corresponding to the sensor signal line.

5. The touch pad of claim 1,
wherein the touch drive IC further includes:
a driving voltage generating unit, which is synchronized with the first common voltage and the second common voltage and generates the driving voltage.

6. The touch pad of claim 5, further comprising:
a memory in a unit of a frame, which sequentially stores the contactless capacitive capacitance $C_h$ generated in the touch sensor,
wherein the touch detecting unit interprets a 3D input of the touch input means by using the contactless capacitive capacitance $C_h$ stored in the memory.

7. The touch pad of claim 1, wherein as the first common voltage, an reverse phase voltage of a voltage applied to the touch sensor is applied, and as the second common voltage, an in-phase voltage of a voltage applied to the touch sensor is applied.

8. The touch pad of claim 1, wherein the touch detecting unit senses a touch by grouping two or more touch sensors.

9. A method of detecting a touch by using a touch pad disposed on a display device, the method comprising:
applying a precharge voltage $V_{pre}$ to a plurality of touch sensors so as to generate contact capacitive capacitance $C_t$ or contactless capacitive capacitance $C_h$ when a contact touch or a contactless touch is generated by a touch input means;
applying a common voltage to a plurality of common driving electrodes so as to generate common electrode capacitance $C_{v\_com}$ between the touch sensors, in which first common electrode capacitance $C_{v\_com1}$ is generated by applying a first common voltage to a first common driving electrode corresponding to the touch sensor generating the contact capacitive capacitance $C_t$ and second common electrode capacitance $C_{drv\_com2}$ is generated by applying a second common voltage to a second common driving electrode corresponding to the touch sensor generating the contactless capacitive capacitance $C_h$; and
sensing the contact capacitive capacitance $C_t$ and the contactless capacitive capacitance $C_h$,
wherein the method further comprises:
generating a driving voltage while being synchronized with the first common voltage and the second common voltage by a driving voltage generating unit within a touch drive IC; and
determining, by a touch detecting unit within the touch drive IC, a contact touch or a contactless touch by the touch input means based on a difference between a first voltage, at which the contact capacitive capacitance $C_t$ or the contactless capacitive capacitance $C_h$ is generated, and a second voltage, at which the contact capacitive capacitance $C_t$ or the contactless capacitive capacitance $C_h$ is not generated, in a state where the driving voltage is applied to a driving capacitor $C_{drv}$ within the touch drive IC.

10. The method of claim 9, wherein the touch sensors are arranged in an array formed in a matrix within an active area of the display device.

11. The method of claim 10, wherein each common driving electrode has a size so as to correspond to one or more touch sensors within at least one column of the array or correspond to one or more touch sensors within at least one row of the array.

12. The method of claim 11, wherein in the common driving electrode, a width of an area corresponding to the touch sensor is larger than a width of an area corresponding to at least one sensor signal line transmitting a touch signal generated in the touch sensor.

13. The method of claim 9, further comprising:
sequentially storing the contactless capacitive capacitance $C_h$ generated in the touch sensor in a memory in a unit of a frame; and
interpreting, by the touch detecting unit, a 3D input of the touch input means by using the contactless capacitive capacitance $C_h$ stored in the memory.

14. The method of claim 9, wherein as the first common voltage, an reverse phase voltage of a voltage applied to the touch sensor is applied, and as the second common voltage, an in-phase voltage of a voltage applied to the touch sensor is applied.

15. The method of claim 9, wherein the plurality of touch sensors is grouped by the touch detecting unit and simultaneously senses the touch.

* * * * *